United States Patent [19]

Jarvis

[11] 4,056,421
[45] Nov. 1, 1977

[54] METHOD OF FABRICATING CROSSLINKED THERMOPLASTICS ARTICLES

[75] Inventor: Harold F. Jarvis, Moffat, Canada

[73] Assignee: Shaw Pipe Industries Ltd., Toronto, Canada

[21] Appl. No.: 758,161

[22] Filed: Jan. 10, 1977

[51] Int. Cl.² .......................... B29C 19/02; C09J 5/00
[52] U.S. Cl. ..................................... 156/272; 156/306
[58] Field of Search ...................... 156/272, 306, 8, 9, 156/334, 290

[56] References Cited

U.S. PATENT DOCUMENTS

| | | | |
|---|---|---|---|
| 2,402,631 | 6/1946 | Hull | 156/272 |
| 2,628,214 | 3/1953 | Pinkney | 156/334 |
| 2,936,261 | 5/1960 | Cole | 156/308 |
| 3,106,441 | 10/1963 | Harrison et al. | 156/272 |
| 3,991,243 | 11/1976 | Biddell | 156/309 |

Primary Examiner—Douglas J. Drummond
Attorney, Agent, or Firm—Ridout & Maybee

[57] ABSTRACT

Cross-linked thermoplastics articles are fabricated by providing a radiant energy-crosslinkable thermoplastics sheet, masking areas of the sheet, exposing the masked sheet to appropriate radiant energy, fusing the masked and relatively uncrosslinked areas together under heat and pressure, and locally applying crosslink inducing energy to the fused portions.

7 Claims, 3 Drawing Figures

METHOD OF FABRICATING CROSSLINKED THERMOPLASTICS ARTICLES

BACKGROUND OF THE INVENTION

1. Field of the Invention

The present invention relates to methods for fabricating crosslinked synthetic thermoplastics articles.

2. Description of the Prior Art

Crosslinked thermoplastics, having a controlled degree of crosslinking have properties of toughness, heat resistance and inertness amongst others which render them useful in various applications. However, the possibilities for fabrication of articles from crosslinked thermoplastics materials have in the past been somewhat limited.

One example of the use of crosslinked plastics materials is in the manufacture of the well-known heat-shrinkable pipe sleeves. These are usually formed as crosslinked extruded polyethylene tubes. After crosslinking, the tubes are stretched to an enlarged diameter while in a heat-softened condition and are then rapidly cooled, the stretching and rapid cooling imparting an elastic memory and a heat-shrinkable property to the tubes. Although extrusion is a feasible manufacturing method for sleeves of up to about twelve inches diameter, the existing technology sets limits on the diameters of the tubes which can economically be produced by this method. Further, the conventional type of tube-stretching apparatus cannot be conveniently or satisfactorily adapted to stretching tubes of large diameter. Pipe sleeves of greater diameter could be fabricated if it were possible to obtain a satisfactory weld between the crosslinked materials, since lengths of plastics sheeting of controlled crosslinking cut to the desired length could then be joined together end to end to provide a tubular sleeve of any desired large diameter.

SUMMARY OF THE INVENTION

It has been found that attempts at welding crosslinked polyethylene and other plastics materials together under heat and pressure have not produced reliable welds. Although a physical fusion of the materials is obtained at the weld, which appears to the eye to be completely homogeneous, rigorous examination of the weld reveals the existence of an interface or discontinuity between the welded portions. On heating the weld it proves possible to peel the two portions apart, showing that a true chemical welding, in which molecules of the respective portions become chemically inter-linked through chemical crosslinking bonds, has not occurred to any significant extent.

In this invention, there are used thermoplastics which can be crosslinked through exposure to radiant energy. Many thermoplastics can be crosslinked by exposure to ultraviolet rays or ionizing radiation, and others can be made cross-linkable on exposure to radiant heat energy, e.g. infra red radiation, by blending them with small quantities of crosslinking agents.

According to the invention, such thermoplastics are initially fabricated in the form of sheets and over a pre-determined area of the sheets, the thermoplastic is crosslinked to a controlled degree by exposure to radiant energy. With this arrangement, the crosslinking treatment received by all exposed portions of the sheet can be made substantially uniform and can be controlled closely, so that a substantially uniform and controlled degree of crosslinking can be achieved.

In the radiant energy treatment, selected areas of the thermoplastics sheets are masked with a masking material which is realtively opaque to the radiant energy. In this manner the pieces are provided with relatively uncrosslinked portions where the masking material has prevented the radiant energy from exerting its normal crosslinking effect. These relatively uncrosslinked portions retain melting characteristics more typical of ordinary, uncrosslinked polymers and after shaping the sheets to a more complex configuration these portions can be fused together under heat and pressure so as to yield a homogeneous fusion. The fused portions are locally subjected to crosslink-inducing energy to bring them to a desired degree of crosslinking, either under the heating applied locally during the fusion operation or in a separate step after the fusion has been completed. If a separate crosslinking step is employed, the previously crosslinked portions of the article can be shielded from the crosslinking energy as for example by applying masking material to the previously crosslinked portions and exposing the fused portions to radiant energy, so that the degree of crosslinking of the previously crosslinked portions remains substantially undisturbed. With this method it is possible to fabricate welded articles which have controlled crosslinking throughout substantially the whole of their structure, and which have crosslinked true chemical welds.

In one especially advantageous form, heat-shrinkable articles, e.g. heat-shrinkable pipe sleeves, are formed by stretching the crosslinked sheets while in a heat-softened condition prior to fusing the relatively uncrosslinked portions together. The stretching operation can be readily carried out in a continuous operation if desired by applying tension to the sheets while in a flat or simply curved configuration. During the fusion operation, the previously crosslinked areas of the sheet may be shielded from the heating to avoid any substantial degree of premature heat shrinkage of the article.

The invention is most usefully applied to thermoplastics addition polymers formed from synthetic ethylenically-unsaturated monomers. In the crosslinked form these polymers have particularly advantageous properties especially where they are employed as heat-shrinkable pipe sleeves.

Examples include polyethylenes such as low- or high-density polyethylene, chlorinated or chlorosulfonated polyethylenes, polyvinylacetate, blends thereof and co-polymers of ethylenically-unsaturated monomers e.g. poly-ethylene - vinylacetate.

These polymers can be crosslinked directly by exposure to ultra violet radiation and high-energy forms of ionizing radiations. They can be made cross-linkable on exposure to radiant heating by addition of small contents of crosslinking agents, typically peroxides such as a, a' bis (t-butylperoxy) diisopropylbenzene.

The opaque masking materials may be absorptive or reflective with respect to the radiant energy employed. Examples of materials suitable for use with radiant infra red heating include aluminum foil and asbestos materials. With ionizing radiation, lead foils or thicker aluminum foils are appropriate, and metal foils may be used with ultra violet radiation.

In the crosslinking treatment, the degree of crosslinking achieved in the unmasked areas of the sheet is controllable by varying the conditions of the radiant energy treatment and especially the dwell times for which the workpiece is exposed. Within limits, the degree of crosslinking imparted to the masked portions is controllable by selection from amongst masking materials having varying opacity with respect to the form of radiant energy employed, and simple trial and experiment with differing materials readily enables the user to select a masking material and the conditions of radiant energy treatment to be best adopted in a given manufacturing procedure.

The degree of crosslinking of a given plastics material is definable by reference to solvent extraction tests conducted under standardised conditions on samples of the plastics. At 0% crosslinking a solvent for the plastics will totally dissolve the plastics while a material which suffers no weight loss in such tests is regarded as 100% crosslinked. Intermediate degrees of crosslinking are indicated by proportionately intermediate percentage weight losses.

Desirably, the masked portions are crosslinked to a degree substantially below 50% in order to retain adequate thermoplastics properties to enable a satisfactory fusion weld to be achieved. More typically, the masked portions are 0% to 30% crosslinked, and degrees of crosslinking of 0% to 15% are preferred.

For most purposes, and especially in the manufacture of heat-shrinkable pipe sleeves, the final article will desirably have a degree of crosslinking at a controlled value within the range 40% to 75%. With heat-shrinkable pipe sleeves, for example, sleeves of less than 40% crosslinking have insufficient heat stability to adequately retain their shape at the temperatures attained in the heat-shrinking operation. At crosslinking much in excess of 75% the sleeves are too brittle and cannot readily be used. In the method of this invention, the unmasked areas of the sheet can be brought directly to the required degree of crosslinking in the initial crosslinking treatment. After or during welding, crosslink-inducing energy can be applied locally to the relatively uncrosslinked fused portions, to bring them to degree of crosslinking substantially equal to the previously crosslinked portions.

BRIEF DESCRIPTION OF THE DRAWINGS

The method of the invention will now be described in more detail, by way of example only with reference to the accompanying drawings which illustrate schematically apparatus for use in carrying out the method.

DESCRIPTION OF THE PREFERRED EMBODIMENT

In the following example, the production of heat-shrinkable pipe sleeves will be described, but it may be appreciated that the same principles may be applied to the manufacture of other crosslinked thermoplastics articles.

Initially, a sheet 1 is extruded from thermoplastics materials containing a small addition of a peroxide crosslinking agent and, optionally, an accelerating agent if the crosslinking is desired to be effected in a shortened time. The sheet 1 is crosslinked as it is conveyed continuously on an endless conveyor 2. The sheet passes under a bank of infra red heaters 3. The degree of crosslinking imparted to the exposed areas of the sheet is controllable by varying the dwell time of the sheet at the crosslinking temperature within the heating zone. In a typical example, a low density polyethylene sheet containing a peroxide crosslinking agent such that the onset of crosslinking occurs at about 280° F. may be so subjected to the infra red heating as to maintain the temperature of the sheet at 350° to 360° F. for a period of about 6 to 15 minutes, the sheet being thereby crosslinked to an extent of 40 to 75%.

Figure 1:
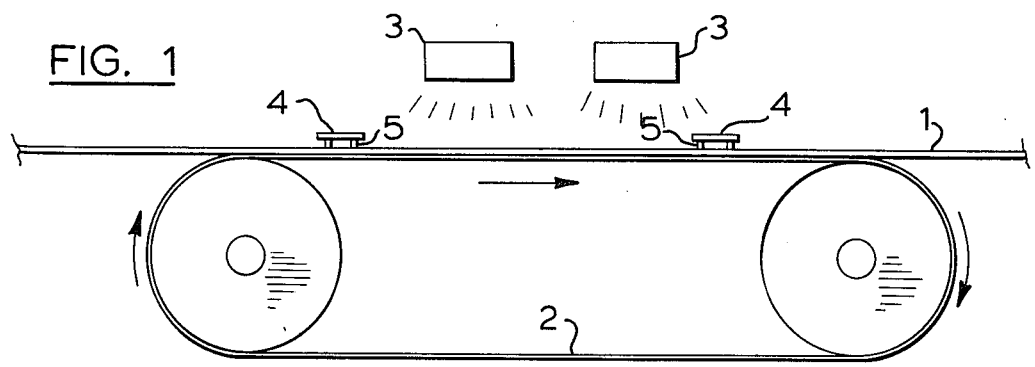
FIG. 1 shows one form of apparatus for use in crosslinking the sheet material.
Figure 2:
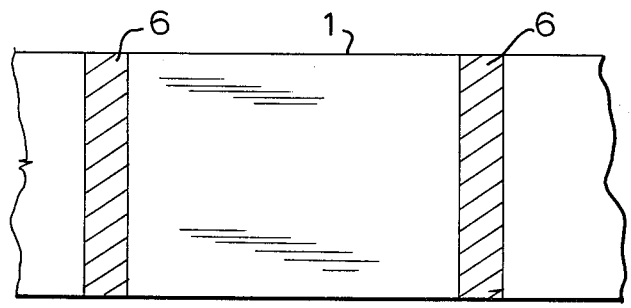
FIG. 2 is a plan view of the crosslinked sheet.

As shown in FIG. 1, masking strips 4 of a material relatively opaque to the infra red radiation are placed at regular intervals on the upper surface of the sheet 1 prior to the crosslinking treatment. Examples of appropriate masking materials include aluminum foil, metal bars, and asbestos. The strips 4 are supported on legs 5 just above the surface of the sheet 1 to reduce the risk of the strips sticking to or marking the sheet. The spacing of the strips is desirably less than would be predicated by the diameter of the pipe with which the final sleeve is to be used i.e. it is less than the total of the circumference of the pipe plus the width of the overlap it is desired to employ between the edges of the sheet in the later fusing or welding operation, so that when the sleeve is finally shrunk onto the pipe, a radial compressive stress is exerted. The masking strips 4 shield the underlying portions of the sheet 1 from the infra red heating during the crosslinking operation, so that in the crosslinked product, as shown in FIG. 2, the protected areas 6 have imparted to them a greatly reduced degree of crosslinking, of typically no more than about 15%.

Before removing the crosslinked sheet from the conveyor belt 2, the sheet is cooled under air cooling fans to a temperature below its crosslinking temperature, and the masking strips 4 are removed.

Thereafter, the crosslinked sheet 1 is subject to a conventional stretching operation while at a temperature adequate to soften the sheet without raising it to the crosslinking temperature, typically at 130° to 300° F, more suitably at a temperature of from 130° to 230° F. The stretched sheet is thereafter cooled in order to maintain the sheet in its stretched condition. Depending on the requirement for shrinkage of the final sleeve, the degree of stretching may be in the range of 10 to 100%, but more suitably 25 to 40%.

If a conventional mastic material is to be applied, this may conveniently be coated onto the sheet after the stretching operation, and it is important that the areas 6 of the sheet which are to be welded together should be left clean and free of the mastic coating, so that the latter will not interfere with the subsequent welding operation.

Figure 3:
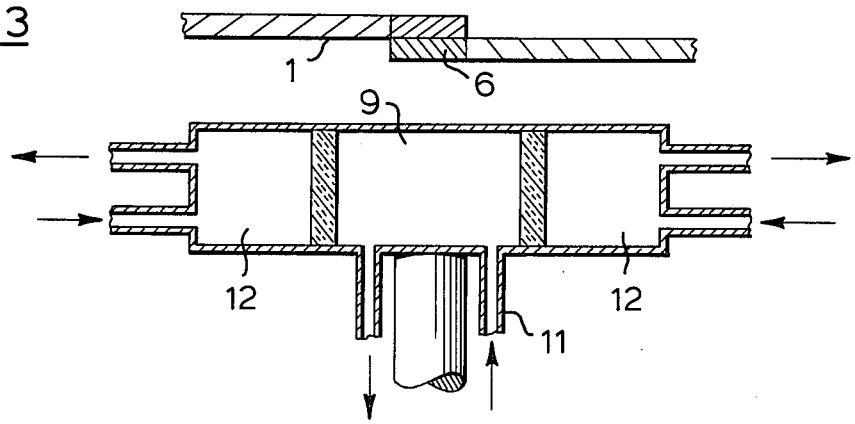
FIG. 3 shows one form of fusion press.

The sheet is then severed into lengths by cutting transversely through the middle of the areas 6. The individual sleeves are formed by bringing the two opposing edges of the cut sheet lengths around into a circle and fusing the overlapped relatively uncrosslinked portions 6 together in a press, as illustrated in FIG. 3. Before the fusing operation, the edges may be prepared by roughening with sand paper or with a wire brush.

Each platen of the press has a heatable central chamber 9, which may, for example, be heated with hot oil supplied through pipes 11, and two edge chambers 12 insulated from the central chamber by insulating material barriers 13. During the fusion operation, cooling water is passed through the edge chambers 12 in order to confine the heating mainly to the portions 6 to be fused together and thus minimize disturbance of the crosslinking of the previously crosslinked portions, avoid any substantial degree of premature heat shrinkage, and avoid excessive flow of the plastics material during the fusion operation.

Initially the overlapped ends of the sheet are introduced into the press while the platens are cold and the platens are then brought together to exert a clamping pressure typically of the order of 2 to 200 psi, but more suitably 10 to 50 psi. The central chamber 9 of the platens is then heated to raise the temperature sufficiently to melt the relatively uncrosslinked portions 6 and fuse them together. The platens may then be maintained at a temperature above the crosslinking temperature for a period sufficient to bring the fused portions to a degree of crosslinking equal to or approximating that of the remainder of the sleeve. By way of example, in the case of the polyethylene material mentioned above, the platens may be maintained at a temperature of about 320° F. for approximately 30 minutes, the platens then being cooled and the finished welded sleeve removed. Alternatively, after maintaining the platens at elevated temperature for a period of about 3 minutes sufficient to achieve thermoplastic fusion of the portions 6, the sleeve may be removed from the press and the fused area crosslinked under infra red radiation for about 5 minutes, the previously crosslinked portions of the sleeve being masked from the radiant heat by infra red-opaque material so as to avoid premature heat shrinkage of the sleeve. While some degree of increased crosslinking may occur in parts of the sleeve adjacent the fused portions, this effect is confined to small localised areas and does not detract substantially from the desired properties of the sleeve.

In modifications of the method described above in detail the initial masked sheet can be crosslinked at substantially ambient temperature by exposure to ultra violet or ionizing radiations under controlled conditions of radiant energy dosage, the masks 4 being selected to be relatively opaque to the radiant crosslinking energy employed. In such case it is desirable to mark the sheet with markers indicating the location of the masking strips so that the protected areas 6 of relatively low crosslinking can thereafter be readily identified. Following the crosslinking operation, the crosslinked sheet can be subjected to the same stretching severing and fusing operations as described above in connection with the sheets subjected to the infra red radiation crosslinking treatment.

I claim:

1. A method of fabricating crosslinked synthetic plastics articles comprising providing crosslinkable synthetic thermoplastics material in sheet form, crosslinking areas of the sheets to a controlled degree of crosslinking by exposing them to crosslink-inducing radiant energy while providing relatively uncrosslinked portions thereon by masking selected areas of the sheets with masking material relatively opaque to the radient energy, shaping the crosslinked sheets into a more complex configuration and bringing relatively uncrosslinked portions of the sheets into contact, fusing the contacted portions together under heat and pressure, and locally applying crosslink-inducing energy to the fused portions.

2. The method of claim 1 wherein heat-shrinkable articles are formed by heat-softening the crosslinked sheets, stretching them, and rapidly cooling them before shaping the crosslinked sheets into a more complex configuration.

3. The method of claim 1 wherein the crosslinked sheets are shaped into tubular sleeve form.

4. The method of claim 3 wherein a continuous sheet of the crosslinkable material is masked at a plurality of spaced transverse stripe portions, and is severed into lengths by cutting transversely through the masked portions after crosslinking, the relatively uncrosslinked end portions of the severed pieces being overlapped and fused together.

5. The method of claim 1 wherein the unmasked areas of the sheets are crosslinked to a degree of 40 to 75%.

6. The method of claim 1 wherein the masked areas are crosslinked to a degree of 0 to 30% prior to fusion.

7. The method of claim 6 wherein the masked areas are crosslinked to a degree of 0 to 15% prior to fusion.

* * * * *